United States Patent
Takahashi et al.

(10) Patent No.: US 6,720,067 B2
(45) Date of Patent: Apr. 13, 2004

(54) POLYPROPYLENE BASE POROUS FILM AND PRODUCTION PROCESS FOR THE SAME

(75) Inventors: Yoshinori Takahashi, Shinnanyo (JP); Daisuke Osaki, Shinnanyo (JP)

(73) Assignee: Tokuyama Corporation, Yamaguchi-ken (JP)

( * ) Notice: Subject to any disclaimer, the term of this patent is extended or adjusted under 35 U.S.C. 154(b) by 0 days.

(21) Appl. No.: 10/108,867

(22) Filed: Mar. 29, 2002

(65) Prior Publication Data

US 2003/0068483 A1 Apr. 10, 2003

(30) Foreign Application Priority Data

Mar. 30, 2001 (JP) .......................................... 2001-98069

(51) Int. Cl.$^7$ ............................... B32B 3/00; B32B 3/26
(52) U.S. Cl. ............................... 428/315.5; 428/304.4; 428/317.9; 428/318.4
(58) Field of Search ..................... 428/304.4, 315.5, 428/317.9, 318.4

(56) References Cited

U.S. PATENT DOCUMENTS 5,176,953 A * 1/1993 Jacoby et al. ............. 428/315.5
6,156,421 A * 12/2000 Stopper et al. ........... 428/315.5

FOREIGN PATENT DOCUMENTS

| EP | 0 227 037 | 7/1987 | ............... 428/304.4 |
| EP | 1 113 039 A | 7/2001 | ............... 428/304.4 |
| JP | 9-277414 | 10/1997 | ............... 428/304.4 |

OTHER PUBLICATIONS

Derwent English Abstract of 58134158A.*

* cited by examiner

Primary Examiner—Daniel Zirker
Assistant Examiner—Victor S Chang
(74) Attorney, Agent, or Firm—Wenderoth, Lind & Ponack, L.L.P.

(57) ABSTRACT

Provided is a porous film which is excellent in a tear strength and has a low heat shrinkage. Such film is produced by subjecting to heat treatment on specific conditions, a porous film comprising a resin composition comprising:

(a) a polypropylene base resin blend comprising 100 parts by weight of an ethylene-propylene block copolymer having a maximum peak temperature (Tm) of 140° C.≦Tm≦165° C. which is given by differential scanning calorimetry (DSC), 3 to 40 parts by weight of low density polyethylene and 3 to 40 parts by weight of an ethylene-vinyl acetate copolymer, (b) calcium carbonate, (c) titanium oxide coated on a surface thereof with silica and/or alumina, (d) a hindered amine light stabilizer having a molecular weight of 1500 to 4500, (e) an ethyl ester phosphorous acid or biphenylene phosphonite antioxidant, and (f) a hindered phenol antioxidant, wherein the above resin composition comprises 100 to 200 parts by weight of (b), 0.5 to 20 parts by weight of (c), 0.2 to 10 parts by weight of (d), 0.03 to 3 parts by weight of (e) and 0.05 to 3 parts by weight of (f) each per 100 parts by weight of (a). A laminate sheet comprising this polypropylene base porous film and a polyolefin base nonwoven fabric is excellent in a moisture permeability, a weatherability and a heat resistance.

10 Claims, No Drawings

POLYPROPYLENE BASE POROUS FILM AND PRODUCTION PROCESS FOR THE SAME

The present invention relates to a porous film used for moisture-permeable and waterproofing sheets for a roof and a wall, a production process therefor and a laminate sheet comprising the above porous film and a polyolefin base nonwoven fabric. More specifically, the present invention relates to a porous film which is excellent in a heat adhesive property to a polyolefin base nonwoven fabric and which has not only a moisture permeability and a waterproofing property but also a weatherability and a heat resistance and a laminate sheet produced using the above porous film.

A polyolefin base porous film has so far been widely used as a waterproofing and moisture-permeable material which is used in a so-called air-permeable layer method for a wall and a roof. A strength and a durability as well as the functions of waterproofing and moisture permeablity are required to a moisture-permeable film used for such use in construction, and it is required as well to be inexpensive.

Accordingly, the above porous film is usually laminated on one face or both faces thereof with a reinforcing porous material such as a nonwoven fabric, whereby it is attempted to elevate the strength and the durability. Heat fusion or sticking with a hot melt adhesive is usually used for the laminating method. In particular, used in many cases from a viewpoint of a profitability is a method in which fused on the above porous film is a nonwoven fabric comprising a polyethylene (hereinafter referred to as PE) fiber or a polypropylene (hereinafter referred to as PP) fiber, for example, a span bond, which is produced by a heat fusion method. In order to obtain a good laminate, a porous film having a good heat fusibility with a nonwoven fabric has to be used, and therefore the film comprising a resin of the same series as a nonwoven fabric, usually a PP base resin is used in many cases. In this connection, the PP resin is a general term of an olefin polymer or an olefin polymer mixture comprising 50 wt % or more of a propylene component.

Further, it is investigated to reduce a film thickness of a polyolefin base porous film and expedite a film-forming speed thereof as means for reducing the production cost. PE base resin porous films out of polyolefin base porous films blended with a large amount of inorganic fillers are proposed to be improved in a moldability by blending with other resins and adding the third components. However, a technique for producing a PP base resin porous film having a small film thickness at a high rate has scarcely been present.

Accordingly, there has been desired a technique for forming a PP base porous film at a high rate, which has excellent appearance, air permerable-moisture permeable property and durability and a high tear strength and which has a thin and even film thickness.

When laminate sheets comprising a PP base porous film and a nonwoven fabric are used for building materials such as house wrapping and roofing, they are left standing in an outside place where they are exposed directly to sunshine before construction, whereby they are likely to be deteriorated. Further, the performances such as a waterproofing property are reduced with the passage of time after construction in a certain case by heat conduction from sunshine and heaters. Under such circumstances, in a law related to an acceleration in quality security in houses which is enforced in April, 2000, guaranty for 10 years is requested to materials such as laminate sheets which are used outside as construction materials. In order to provide laminate sheets which can meet this requirement, a weatherability-heat resistance test is imposed to the above sheets in the industrial field where house-related materials are produced. It is judged in this test whether or not laminate sheets irradiated with a UV ray and then subjected to heat treatment have performances as a moisture permeable-water proofing sheet, and the above sheets are evaluated as having a moisture permeable-water proofing property if they show a water resistance of some fixed level.

Included is another problem that a laminate sheet produced by sticking a PP base porous film having a large heat shrinkage together with a polyolefin base nonwoven fabric by heat fusion causes deformation (curl and the like) by heat shrinking, so that the above film has to be subjected to heat shrinkage-reducing treatment by preliminary heating before sticking, which has inevitably resulted in increasing the treating cost. Further, a porous film subjected to such heat shrinkage-reducing treatment is reduced in a length, and therefore there has been involved therein the problem that an extra raw material cost is required in order to make up for a reduction thereof.

Proposed as a publicly known example of a porous film for construction materials such as house wrapping which is improved in a weatherability is, for example, a porous film obtained by monoaxially or biaxially drawing a composition comprising a PE base resin, an inorganic filler and a UV absorber (Japanese Patent Application Laid-Open No. 277414/1997). However, both of this porous film and a laminate sheet produced by laminating it on a polyolefin base nonwoven fabric do not show a satisfactory weatherability and has a problem as well on a strength.

Accordingly, an object of the present invention is to develop a PP base porous film which can be produced at a high rate and is excellent in a film appearance, a tear strength and performances as a construction material and which has a low heat shrinkage and shows sufficiently high moisture permeability and weatherability-heat resistance when it is laminated on a polyolefin base nonwoven fabric to form a sheet. Intensive investigations repeated by the present inventors have resulted in finding that the intended PP base porous film can be obtained by molding into a sheet, a resin composition comprising a resin blend comprising an ethylene-propylene block copolymer, a low density PE and an ethylene-vinyl acetate copolymer in a specific proportion; calcium carbonate as an inorganic filler; titanium oxide covered on a surface thereof with silica and/or alumina as a weatherability-heat resistance improver; a specific light stabilizer; and a specific antioxidant, then drawing it, subjecting it to heat treatment at a prescribed temperature and preferably taking it at a specific heat treatment draw ratio (ratio of a cooling roll speed to a heat treatment roll speed).

Thus, provided according to the present invention is a porous film comprising a resin composition comprising:

(a) a polypropylene base resin blend comprising 100 parts by weight of an ethylene-propylene block copolymer having a maximum peak temperature (Tm) of $140°$ C.$\leq$Tm$\leq 165°$ C. which is given by differential scanning calorimetry (DSC), 3 to 40 parts by weight of a low density polyethylene and 3 to 40 parts by weight of an ethylene-vinyl acetate copolymer, (b) calcium carbonate, (c) titanium dioxide coated on a surface thereof with silica and/or alumina, (d) a hindered amine light stabilizer having a molecular weight of 1500 to 4500, (e) an ethyl ester phosphorous acid or biphenylene phosphonite antioxidant, and (f) a hindered phenol antioxidant, wherein the above resin composition comprises 100 to 200 parts by weight of (b), 0.5 to 20 parts by weight of (c), 0.2 to 10 parts by weight of (d), 0.03 to 3 parts by weight of (e) and 0.05 to 3 parts by weight of (f) each per 100 parts by weight of (a).

Further, provided according to the present invention is a production process for the porous film described above comprising the steps of:

molding the resin composition comprising the components (a) to (f) described above into a sheet and drawing it, then subjecting it to heat treatment at a temperature (T) satisfying the following equation (1):

$$Tc-30 \leq T < Tc \quad (1)$$

(wherein Tc represents a crystallizing temperature of the raw material resin composition, and T represents a heat treatment roll temperature), and then taking it at a heat treatment draw ratio (R2/R1) satisfying the following equation (2):

$$0.80 \leq (R2/R1) \leq 0.95 \quad (2)$$

(wherein R1 represents a heat treatment roll speed, and R2 represents a cooling roll speed).

Further, provided according to the present invention is a laminate sheet comprising the above porous film and laminated therelon a polyolefin base nonwoven fabric, wherein the laminate sheet has a water vapor transmission rate of 1000 to 3000 g/cm²·24 hours.

The largest characteristic of the PP base porous film of the present invention resides in the point that it is a porous film which does not cause leakage of water at an atmospheric pressure and which has a tear strength of 50 mN or more in an alignment direction and a thin and even film thickness and that a laminate sheet produced by laminating it on a nonwoven fabric is excellent in a weatherability-heat resistance and has a water vapor transmission rate of 1000 to 3000 g/cm²·24 hours. Further, another characteristic of the above film is that it has a low heat shrinkage and that a laminate sheet produced by thermally fusing it on a polyolefin base nonwoven fabric does not cause deformation (curl and the like) and is decreased in length loss (increase in the raw material cost) caused by heat shrinking.

In order to achieve the objects of the present invention described above, the film has to be produced from the resin composition prepared by blending the specific PP base resin blend with the specific additives and the like according to the specific production method.

In the present invention, used as the PP base resin blend (a) is the blend comprising 100 parts by weight of the ethylene-propylene block copolymer having a maximum peak temperature (Tm) of 140° C.$\leq$Tm$\leq$165° C. which is given by differential scanning calorimetry (DSC), 3 to 40 parts by weight of the low density polyethylene and 3 to 40 parts by weight of the ethylene-vinyl acetate copolymer.

The ethylene-propylene block copolymer falling in the range described above in DSC is essential for obtaining the flexibility and the tear strength of the porous film of the present invention.

The ethylene component is desirably contained in this copolymer in a proportion of 2 to 30% by weight, suitably 4 to 10% by weight. The propylene component is desirably present therein in a proportion of 70 to 98% by weight, preferably 90 to 96% by weight. Allowed to be contained in the ethylene-propylene block copolymer is, for example, 2% by weight or less of α-olefin having 4 to 12 carbon atoms, suitably 1-butene as other copolymerizing components.

The ethylene-propylene block copolymer may be blended with 30% by weight or less, preferably 10% by weight or less of other resin components, for example, a propylene homopolymer, an ethylene-propylene random copolymer and a propylene-1-butene copolymer. However, if these resins are blended in a large amount exceeding 30% by weight, the resulting porous film does not satisfy the performances intended in the present invention and is reduced in, for example, a tear strength, so that it is difficult to laminate the film on a reinforced article.

The low density PE used in the present invention is produced by a high pressure polymerization method and has a density of usually 0.91 to 0.93 g/cm³, suitably 0.915 to 0.926 g/cm³. If the blending amount of the low density PE is less than 3 parts by weight, draw resonance is caused, and the primary film can not be molded at a molding rate of 20 m/minute or more. On the other hand, if the above blending amount exceeds 40 parts by weight, the sufficiently high water vapor transmission rate is not obtained. Draw resonance is a phenomenon in which a molten resin extruded from a die shows a periodic change in a thickness in a flow direction (MD direction) and causes an acceleration in uneven drawing in cold drawing.

The ethylene-vinyl acetate copolymer used in the present invention has a vinyl acetate content of preferably 15 to 40% by weight (about 5 to 13 mole %), more preferably 20 to 30% by weight. If the ethylene-vinyl acetate copolymer in the resin blend (a) has a content of less than 3 parts by weight, vertical stripes are liable to be produced on the film to deteriorate the appearance. On the other hand, if it exceeds 40 parts by weight, a rigidity and a heat resistance of the film tend to be lowered.

The respective resins described above have preferably a melt index (MI) of preferably 1.0 to 15 g/10 minutes. Particularly, the ethylene-propylene block copolymer and the low density PE have an MI of suitably 4.0 to 10 g/10 minutes, and the ethylene-vinyl acetate copolymer has an MI of suitably 2.0 to 5.0 g/10 minutes. If the MI is less than 1.0, the melt viscosity is high, and the resin pressure and the resin temperature are elevated, so that the high-speed moldability (productivity) tends to be lowered, and in addition thereto, the film tends to be lowered in a water vapor transmission rate. On the other hand, if the MI exceeds 15, the film is improved in a water vapor transmission rate, but the resin pressure is less liable to be elevated in molding, and a precision in a thickness and a mechanical strength of the film are reduced. The MI is determined on the conditions of a load of 2160 g and a temperature of 230° C. based on JIS K 6758 in the case of the ethylene-propylene block copolymer, and it is determined on the conditions of a load of 2160 g and a temperature of 190° C. based on JIS K 6760 in the case of the low density PE and the ethylene-vinyl acetate copolymer.

The resin composition for molding the porous film of the present invention is prepared by blending the PP base resin blend (a) described above with calcium carbonate (b), the weatherability-heat resistance improver (c), the light stabilizer (d) and the antioxidants (e and f) in the prescribed proportions respectively.

Capable of being used as calcium carbonate (b) without restrictions is any of heavy calcium carbonate produced by mechanically crushing crystalline lime stone of a calcite type having a high purity and classifying it and precipitated calcium carbonate produced by a wet process according to chemical reaction such as a carbon dioxide reaction method, a calcium chloride soda method and a lime soda method. Calcium carbonate has preferably an average particle diameter of 0.1 to 30 μm, particularly 0.8 to 5.0 μm from the viewpoints of a rise in the mechanical properties and a revelation in the moisture permeability.

Calcium carbonate (b) is blended in an amount of 100 to 200 parts by weight, suitably 120 to 150 parts by weight per 100 parts by weight of the PP base resin blend (a). If the blending amount of calcium carbonate (b) is less than 100 parts by weight, it is difficult to form a communicating hole in the film, and the film is reduced in a water vapor transmission rate. On the other hand, if it is more than 200 parts by weight, the film is increased in a water vapor transmission rate but is reduced in a high-speed productivity and a mechanical characteristic, and the film having the prescribed physical properties is not obtained.

Further, capable of being used in addition to calcium carbonate (b) in a range of not exceeding 50% by weight based on the blending amount of calcium carbonate (b) are other inorganic fillers, for example, barium sulfate, gypsum, calcium sulfite, calcium phosphate, magnesium carbonate, silicic acid hydrate, silicic anhydride, soda ash, sodium chloride, talc, clay, various cements, volcanic ash, shirasu, titanium oxide, iron oxide, carbon black, various metal powders, other inorganic matters and organic metal salts comprising principally inorganic matters. They can be used not only alone but also in combination of plural kinds thereof.

In the present invention, a weatherability-heat resistance of the laminate sheet is evaluated by measuring a hydraulic pressure resistance of the laminate sheet which is irradiated with a UV ray at an intensity of 88 MJ/m$^2$ by means of a sunshine carbon arc lamp and then subjected to heat treatment for 7 weeks under an atmosphere of 90° C. In a test method according to JIS A 6111, the weatherability in applying a moisture permeable-waterproofing sheet in the outside such as construction sites is evaluated by irradiating the sheet with a UV ray having a wavelength of 300 to 400 nm at an intensity of 44 MJ/m$^2$ by means of a sunshine carbon arc lamp. This UV ray dosage corresponds to a sunshine UV ray dosage of 2 months based on the annual average value. However, a film exposed outside is accelerated in UV ray degradation and heat degradation in a season extending from May through September when the ambient temperature is high and the UV dosage is increased. Accordingly, irradiation at an intensity of 88 MJ/m$^2$ which corresponds to outdoor exposure during 4 months has been adopted in the test in he preset invention taking safety into consideration. The heat treatment carried out subsequently to the irradiation is based on JIS A 6930, and heat degradation caused by this heat treatment corresponds to heat degradation caused when left standing for 10 years under an atmosphere of 35° C. This heat treatment test is considered to be suitable from the viewpoint of guaranty for 10 years required to materials for basic structural parts in the law related to an acceleration in quality security in houses which is enforced in April, 2000. In general, a weatherability-heat resistance of a laminate sheet is assessed as good by a hydraulic pressure resistance of 8 kPa or more. In the present invention, however, it is judged as passing the test when the hydraulic pressure resistance is 50 kPa or more taking safety into consideration.

The present invention has the largest characteristic that the PP base resin blend (a), calcium carbonate (b), titanium oxide (c) coated on a surface thereof with silica and/or alumina, the hindered amine light stabilizer (d) having a molecular weight of 1500 to 4500, the ethyl ester phosphorous acid or biphenylene phosphonite antioxidant(e) and the hindered phenol antioxidant (f) each described above are used in the specific proportions as the most effective combination of the raw materials for obtaining the porous film providing the laminate sheet which is excellent in a weatherability-heat resistance. The laminate sheet having a sufficiently high weatherability-heat resistance can not be obtained from a porous film molded from a resin composition deviating from such combination of the raw materials, for example, a resin composition in which at least one of the components described above is lacking or short.

Titanium dioxide (c) coated on a surface thereof with silica and/or alumina is suitably titanium dioxide coated on a surface thereof with silica and/or alumina which is obtained by a chlorine process or a sulfuric acid process and which has a crystalline structure of a rutile type or an anatase type. The amount coated with silica and/or alumina is 2 to 20 parts by weight, preferably 4 to 20 parts by weight per 100 parts by weight of titanium dioxide because of the reasons of a weatherability and a coloring property of the resulting porous sheet. In particular, a product obtained by coating 100 parts by weight of rutile type titanium dioxide with 4 to 10 parts by weight of a silica-alumina combined substance brings about a very excellent weatherability-heat resistance improving effect. Such surface-coated titanium dioxide is already commercially available from, for example, Tioxide Co., Ltd. and the like.

Titanium dioxide (c) coated on a surface thereof with silica and/or alumina is blended in an amount of 0.5 to 20 parts by weight, suitably 1 to 5 parts by weight per 100 parts by weight of the PP base resin blend (a). If this blending amount is less than 0.5 part by weight, lost is a synergistic effect of improving the weatherability brought about by titanium dioxide (c) coated on a surface thereof with silica and/or alumina. On the other hand, if it is more than 20 parts by weight, the weatherability-heat resistance stands in an equilibrium state, and unfavorable results such as a reduction in the water vapor transmission rate and the strength are likely to be brought about.

The hindered amine light stabilizer (d) used has a molecular weight of 1500 to 4500, suitably 2000 to 4000. If the molecular weight is less than 1500, it is not prevented from bleeding onto the surface of the film, and the long term weatherability-heat resistance the laminate sheet is not guaranteed. On the other hand, it is difficult to obtain the compound having a molecular weight exceeding 4500. The examples of such hindered amine include N,N',N'',N'''-tetrakis-(4,6-bis(butyl-(N-methyl-2,2,6,6-tetramethylpiperidine-4-yl)amino)-triazine-2-yl)-4,7-diazadcane-1,10-diamine; poly[{6-(1,1,3,3-tetramethylbutyl)amino-1,3,5-triazine-2,4-diyl}{(2,2,6,6-tetramethyl-4-piperidyl)imino}-hexamethylene{(2,2,6,6-tetramethyl-4-piperidyl)imino}]; poly[(6-morpholino-1,3,5-triazine-2,4-diyl){(2,2,6,6-tetramethyl-4-piperidyl)imino}hexamethylene{(2,2,6,6-tetramethyl-4-piperidyl)imino}]; a polymer of dimethyl succinate with 4-hydroxy-2,2,6,6-tetramethyl-1-piperidineethanol; a polycondensation product of dibutyl-amine-1,3,5-triazine-N,N'-bis(2,2,6,6-tetramethyl-4-piperidyl-1,6-hexamethylenediamine with N-(2,2,6,6-tetramethyl-4-piperidyl)butylamine; a condensation product of 1,2,3,4-butanetetracarboxylic acid and 1,2,2,6,6-pentamethyl-4-piperidinol with β,β,β',β'-tetramethyl-3,9-(2,4,8,10-tetraoxaspiro[5,5]undecane)-diethanol; and polymethylpropyl-3-oxy-[4(2,2,6,6-tetramethyl) piperidinyl]siloxane. They can be used not only alone but also in combination of two or more kinds thereof. In particular, combined use of hindered amines of an NH type and an NCH$_3$ type can allow a synergistic effect of improving the weatherability-heat resistance to be expected. In this case, a combined use proportion of both amines is preferably 2/8 to 8/2 in terms of a weight ratio.

The hindered amine light stabilizer (d) is blended in an amount of 0.2 to 10 parts by weight, preferably 0.5 to 5 parts by weight and more preferably 0.5 to 2 parts by weight per 100 parts by weight of the PP base resin blend (a). If this blending amount is less than 0.2 part by weight, the weatherability-heat resistance can not be revealed. On the other hand, if it is more than 10 parts by weight, the weatherability-heat resistance stands in an equilibrium state, and the cost goes up. In addition to the hindered amine light stabilizer (d) having a molecular weight of 1500 to 4500, a hindered amine light stabilizer having a molecular weight of less than 1500 can additionally be used in a range of not exceeding 50% by weight of the blending amount thereof.

The examples of the ethyl ester phosphorous acid or biphenylene phosphonite antioxidant (e) include bis[2,4-bis(1,1-dimethylethyl)-6-methylphenyl]ethyl ester phosphorous acid; tetrakis(2,4-di-tert-butylphenyl)[1,1-biphenyl]-4,4'-diylbisphosphonite; and tetrakis(2,4-di-tert-butylphenyl)-4,4'-biphenylene phosphonite. The ethyl ester phosphorous acid or biphenylene phosphonite antioxidant (e) is blended in an amount of 0.03 to 3 parts by weight, preferably 0.1 to 1 part by weight per 100 parts by weight of the PP base resin blend (a). If this blending amount is less than 0.03 part by weight, the processing stability in melt-molding is not sufficiently high, and the laminate sheet is reduced in a weatherability-heat resistance. On the other hand, if it is more than 3 parts by weight, processing stability in producing the porous film and a weatherability-heat resistance of the laminate sheet stand in an equilibrium state, and the cost goes up. Further, a phosphite base antioxidant in addition to the ethyl ester phosphorous acid or biphenylene phosphonite antioxidant (e) can additionally be used in a range of not exceeding 50% by weight of the blending amount thereof.

The examples of the hindered phenol antioxidant (f) used in the present invention include pentaerythritol tetrakis[3-(3,5-di-tert-butyl-4-hydroxyphenyl)propionate]; 1,3,5-tris(3,5-di-tert-butyl-4-hydroxybenzyl)-1,3,5-triazine-2,4,6 (1H, 3H, 5H)trione; 3,3',3'',5,5',5''-hexa-tert-butyl-a,a',a''-(mesitylene-2,4,6-triyl)tri-p-cresol; octadecyl-3-(3,5-di-tert-butyl-4-hydroxyphenyl)propionate]; and 2,6-di-tert-butyl-4-(4,6-bis(octylthio)-1,3,5-triazine-2-ylamino)phenol. The hindered phenol antioxidant (f) is blended in an amount of 0.05 to 3 parts by weight, preferably 0.1 to 1 part by weight per 100 parts by weight of the PP base resin blend (a). If this blending amount is less than 0.05 part by weight, a weatherability-heat resistance of the laminate sheet is not sufficiently high. On the other hand, if it is more than 3 parts by weight, the weatherability-heat resistance stands in an equilibrium state, and the cost goes up.

The resin composition of the present invention comprising the components (a) to (f) described above can suitably contain, if necessary, other thermoplastic resins such as a petroleum resin, a pigment, a stabilizer, a surfactant, a plasticizer, an oil and other additives as long as the objects of the present invention are not damaged. For example, metallic salts of fatty acid, particularly metallic salts of hydroxystearic acid can suitably be blended in order to inhibit a resinoid residue (polymer mucus in a general term) which is liable to stick to a lip of a die in extrusion-molding.

The PP base porous film of the present invention has a thickness of 20 to 60 $\mu$m, suitably 20 to 40 $\mu$m and a tear strength of 50 mN or more, preferably 100 mN or more. If the thickness is less than 20 $\mu$m, the tear strength is reduced, and if the thickness exceeds 60 $\mu$m, the cost goes up. If the tear strength is less than 50 mN, the film is likely to be torn in heat fusion with the polyolefin base nonwoven fabric.

Further, the PP base porous film of the present invention has a heat shrinkage of 10% or less, preferably 5% or less. The laminate sheet obtained by thermally fusing the porous film with the polyolefin base nonwoven fabric is less liable to cause deformation such as curl by controlling the heat shrinkage to 10% or less, preferably 5% or less. Further, the PP base porous film of the present invention has a maximum pore diameter of usually 0.5 to 2.0 $\mu$m, suitably 0.7 to 1.3 $\mu$m and shows a hydraulic pressure resistance of 150 kPa or more, suitably 250 kPa or more.

A process for producing the PP base porous film of the present invention shall not specifically be restricted, and a publicly known process can be adopted in blending the components (a) to (f) described above and various optional additives used for producing the PP base porous film of the present invention and pelletizing them. That is, the components described above are mixed by means of a Henshel mixer, a super mixer or a tumbler and then kneaded and pelletized by a method such as strand cutting, hot cutting and underwater cutting by means of a twin screw extruder of a high kneading type or a tandem type kneading machine.

Then, the pelletized composition described above is molded into a film by means of a circular die or a T die installed at the tip of the extruding machine, and the film is drawn by a publicly known method such as a monoaxial or biaxial drawing method, whereby a porous film can be obtained. A T die is preferably used as a film-forming means considering the film-forming speed and a homogeneity of the film.

A molding speed of the primary film is 20 m/minute or more, preferably 30 m/minute or more from the viewpoint of cost performance. A nip roll method can be employed as a cooling method when using a T die, but an air knife method or an air chamber method is preferably adopted since draw resonance can be controlled and the speed can be elevated. A ratio (i.e., draft ratio) of a die lip clearance to a thickness of the primary films is preferably 2 to 30.

The primary film is drawn monoaxially or biaxially by means of a roll drawing machine or a tenter drawing machine to thereby become a porous film. The drawing ratio is usually 1.3 time or more, preferably 1.3 to 3.0 times in terms of an area magnification. Usually, monoaxial drawing is employed, but biaxial drawing is preferably adopted in some cases in order to balance the tear strengths in vertical and lateral directions. The porous film obtained by drawing at a drawing ratio of less than 1.3 time makes it difficult to provide the laminate sheet having a prescribed water vapor transmission rate. On the other hand, if drawn at a drawing ratio of exceeding 3.0 times, the sufficiently high water vapor transmission rate is obtained, but the tear strength is reduced. The drawing temperature is preferably a temperature which is lower by about 20° C. than a melting point of the low density polyethylene resin.

In a heat treatment step carried out after drawing, it is important to control the heat treatment roll temperature and a ratio (heat treatment draw ratio) of the cooling roll speed to the heat treatment roll speed. That is, it is important that the heat treatment roll temperature (T) and the heat treatment draw ratio (R2/R1) satisfy the following equations:

$$Tc-30 \leq T < Tc \qquad (1)$$

$$0.80 \leq (R2/R1) \leq 0.95 \qquad (2)$$

In the equations described above, Tc represents a crystallizing temperature of the raw material resin composition; T represents a heat treatment roll temperature; R1 represents a heat treatment roll speed; and R2 represents a cooling roll temperature.

If the heat treatment roll temperature is equal to or exceeds the crystallizing temperature of the raw material resin composition, the heat shrinkage is reduced, but the resulting porous film is reduced in a water vapor transmission rate, and a water vapor transmission rate of the laminate sheet formed by laminating the above film on the nonwoven fabric is reduced to less than 1000 g/cm²·24 hours. If the heat treatment roll temperature is lower than [the crystallizing temperature of the raw material resin composition −30° C.], the heat shrinkage-reducing effect is not satisfactory. The prepared heat treatment roll temperature is [the crystallizing temperature of the raw material resin composition −5° C.] to [the crystallizing temperature of the raw material resin composition −15° C.]. Also, if the ratio (R2/R1) of the cooling roll speed to the heat treatment roll speed exceeds 0.95, the heat shrinkage-reducing effect is not sufficiently high, and if it is less than 0.8, the film is slackened in molding. Accordingly, it is preferably 0.88 to 0.91.

The sheet obtained by laminating the PP base porous film of the present invention on the polyolefin base nonwoven fabric can suitably be used, for example, as a moisture permeable-waterproofing sheet for roofs and walls.

A heat fusion process is preferably employed as a process for laminating the PP base porous film of the present invention on the polyolefin base nonwoven fabric to produce the sheet from the viewpoints of the workability and the cost. Usually employed is, for example, a process in which a porous film and a polyolefin base nonwoven fabric are wound off from winding machines respectively and laminated and in which they are nipped between an embossing roll heated by electrical heating, induction heating or heat medium circulation heating and a silicone rubber roll to thereby thermally fuse them and then rolled. It is preferred for revealing the satisfactory water vapor transmission rate to control the fused area by embossing to 15% or less. The polyolefin base nonwoven fabric is preferably a polypropylene base nonwoven fabric since the PP base porous film is laminated thereon, and a span bond nonwoven fabric is preferred since it has a high strength.

A moisture permeability and a weatherability-heat resistance of the laminate sheet is influenced by the performances of the porous film. However, in order to secure the heat resistance over a longer period of time, preferably used is a nonwoven fabric to which a hindered amine light stabilizer, a UV absorber or a mixture of both is added in a suitable amount.

In order to permeate moisture coming from the indoor and maintain a hydraulic pressure resistance of 50 kPa or more, the laminate sheet of the present invention has preferably a water vapor transmission rate of 1000 to 3000 g/cm$^2$·24 hours, particularly 1500 to 3000 g/cm$^2$·24 hours.

The PP base porous film of the present invention is evenly perforated, and it has a low heat shrinkage and is excellent in a tear strength. Further, the high melting point thereof makes it easy to thermally fuse with a PP span bond. In addition thereto, according to the present invention, the porous film having a good appearance which is drawn to a thickness of 20 to 60 µm can be taken at a rate of 60 m/minute or more.

Further, the sheet obtained by laminating the above porous film on the polyolefin base nonwoven fabric is excellent in a moisture permeability and a weatherability-heat resistance.

Accordingly, the porous film of the present invention having such properties is suitably used not only for building materials such as house wrapping and roofing and industry materials but also for sanitary materials and porous films for medical use.

EXAMPLES

Examples and comparative examples shall be shown below, but the present invention shall not be restricted to these examples. Physical property values described in the examples and the comparative examples were measured by methods shown below.

1) Thickness (porous film):
   Determined by means of a dial gauge according to a JIS K 6734 method.
2) Crystallizing temperature (porous film):
   The porous film was heated up to 230° C. by means of Exstar DSC 6200R manufactured by Seiko Instruments Co., Ltd. and maintained for 10 minutes, and then it was cooled down to −10° C. at a rate of 10° C./minute, whereby the crystallizing temperature was determined.
3) Heat shrinkage (porous film):
   Straight lines having a length of 100 mm were drawn on the film of 150 mm square in MD and TD directions so that they crossed each other. The film was heated in an oven of 80° C. for one hour and taken out, and then it was left standing at a room temperature, whereby the heat shrinkage was determined.
4) Tear strength (porous film):
   Determined according to a JIS K 6772 method.
5) Water vapor transmission rate (porous film and laminate sheet):

Determined according to a DIN 52615 method under the conditions of a temperature of 23° C. and a humidity of 85%.
6) Weatherability and heat resistance (laminate sheet):
   A sunshine weather meter (model name: S80; manufactured by Suga Tester Co., Ltd.; irradiance: 255 W/m$^2$<300 to 700 nm>) equipped with a sunshine carbon arc lamp was used as a weatherability-accelerating apparatus. A laminate sheet test piece was installed so that the nonwoven fabric part thereof was irradiated with a UV ray and subjected to a weatherability-accelerating test under the condition of a black panel temperature of 63° C. so that the whole irradiation intensity in a UV ray part (300 to 400 nm) came up to 88 MJ/m$^2$. Next, it was subjected to heat treatment at 90° C. for 7 weeks in a gear oven, and then the laminate sheet was measured for a hydraulic pressure resistance according to a JIS L 1092B method. The laminate sheet having a hydraulic pressure resistance of 50 kPa or more was assessed as having sufficiently high weatherability and heat resistance as a construction material.
7) Maximum pore diameter (porous film):
   Determined by an ethanol bubble point method according to an ASTM F 316 method.
8) Hydraulic pressure resistance (porous film and laminate sheet):
   Determined according to a JIS L 1092 method.
9) Film appearance:
   The presence of vertical stripes (uneven thickness) in an MD direction was visually judged.

Examples 1 to 6

Blended were 100 parts by weight of an ethylene-propylene block copolymer (trade name: PN640G; ethylene content=4.1% by weight; MI=6.5 g/10 minutes; manufactured by Tokuyama Corporation), low density PE (trade name: 16SPO; MI=4.5 g/10 minutes; manufactured by Mitsui Chemicals, Inc.) of an amount shown in Table-2 and an ethylene-vinyl acetate copolymer (trade name: EV460; MI=2.5 g/10 minutes; vinyl acetate content=19% by weight; manufactured by Du Pont-Mitsui Polychemicals Co., Ltd.) of an amount shown in Table-2. Heavy calcium carbonate (trade name: CSK-5; specific surface area=15500 cm$^2$/g; average particle diameter=1.4 µm; manufactured by Dowa Calfine Co., Ltd.) and titanium dioxide, a hindered amine light stabilizer and an antioxidant each shown in table-1 were added to 100 parts by weight of the resulting resin blend in amounts shown in Table-2. They were mixed by means of a super mixer, and the mixture was molten and extruded at a cylinder temperature of 190° C. by means of a twin screw extruder to obtain a pelletized kneaded matter. This pellet was extruded from a T-die having a lip clearance of 650 µm installed to a tip part of a single screw extruder having a diameter of 65 mm at a die temperature of 200° C. and received on a take-off unit cooled by an air knife-cooling system at a maximum molding speed (stable molding speed) at which draw resonance was not caused to thereby obtain a primary film having a thickness of 55 µm. The draft ratio was 12. The above primary film was preheated at 60° C., drawn in a monoaxial direction on the conditions of a drawing temperature of 95° C. and a drawing ratio of 2.0 times and then subjected to heat treatment between an annealing roll having a temperature of 110° C. and a cooling roll having a temperature of 40° C. at a heat treatment draw ratio of 0.89 to thereby obtain a porous film having a thickness of 35 µm. The physical properties obtained by measuring the porous films thus obtained are shown in Table-2 together with the molding conditions.

Further, the above porous films were subjected to thermal lamination (heat fusion) with a PP base span bond nonwoven fabric (50 g/m$^2$) at an embossing roll temperature of 150° C. to obtain laminate sheets of 85 g/m$^2$. The physical properties obtained by measuring these laminate sheets are shown in Table-2.

TABLE 1

Titanium dioxide

| Code | Trade name | Maker | Surface-coated amount |
|---|---|---|---|
| A | R-TC30 | Tioxide Co. | $Al_2O_3$ = 3.5%; $SiO_2$ = 1.2% |
| B | R-101 | Du Pont Co. | None |

Hindered amine light stabilizer or UV absorber (for comparison)

| Code | Trade name | Kind | Maker | Molecular Weight |
|---|---|---|---|---|
| C | Tinuvin 622LD | Hindered amine light stabilizer | Ciba Specialty Chemicals K.K. | 3500 |
| D | Chimassorb 944FD | Hindered amine light stabilizer | Ciba Specialty Chemicals K.K. | 2600 |
| E | Sanol LS-770 | Hindered amine light stabilizer | Sankyo Company, Ltd. | 480 |
| F | LA31 | UV absorber (for comparison) | Asahi Denka Kogyo K.K. | 660 |

Antioxidant

| Code | Trade name | Kind | Maker |
|---|---|---|---|
| G | Sandstab P-EPQ | Biphenylene phosphonite | Clariant (Japan) K.K. |
| H | Irgafos 38 | Ethyl ester phosphrous acid | Ciba Specialty Chemicals K.K. |
| I | Irgafos 168 | Phosphite (for comparison) | Ciba Specialty Chemicals K.K. |
| J | Irganox 3114 | Hindered phenol | Ciba Specialty Chemicals K.K. |

Comparative Examples 1 to 2

The same procedure as in Example 1 was repeated to obtain porous films, except that the grade of the ethylene-propylene block copolymer used in Example 1 was changed to an ethylene-propylene random copolymer (trade name: PN540G; ethylene content=5.5% by weight; MI=7.5 g/10 minutes; manufactured by Tokuyama Corporation) in Comparative Example 1 and changed to a propylene homopolymer (trade name: PN130G; MI=4 g/10 minutes; manufactured by Tokuyama Corporation) in Comparative Example 2. The physical properties obtained by measuring these porous films are shown in Table-3 together with the molding conditions.

Further, the above porous films were subjected to thermal lamination (heat fusion) with a PP base span bond nonwoven fabric (50 g/m²) at an embossing roll temperature of 150° C. to obtain laminate sheets of 85 g/m². The physical properties obtained by measuring these laminate sheets are shown in Table-3.

A reduction in a tear strength was observed in Comparative Examples 1 and 2. Further, a reduction in a water vapor transmission rate was further observed in the film prepared in Comparative Example 1 in which the ethylene-propylene random copolymer was used.

Comparative Examples 3 and 4

The same procedure as in Example 1 was repeated to obtain porous films, except that the low density polyethylene was not blended in Comparative Example 3 and the ethylene-vinyl acetate copolymer was not blended in Comparative Example 4. The physical properties obtained by measuring the porous films thus obtained are shown in Table-3 together with the molding conditions.

Further, the above porous films were subjected to thermal lamination with a PP base span bond nonwoven fabric (50 g/m²) at an embossing roll temperature of 150° C. to obtain laminate sheets of 85 g/m². The physical properties obtained by measuring these laminate sheets are shown in Table-3.

In Comparative Example 3 in which the low density polyethylene was not blended, draw resonance was caused when a molding speed of the primary film exceeded 10 m/minute, and therefore high-speed molding was difficult. Further, in Comparative Example 4 in which the ethylene-vinyl acetate copolymer was not blended, vertical stripes were produced on the drawn porous film to damage the appearance.

Comparative Examples 5 to 11

The same procedure as in Example 1 was repeated to obtain porous films, except that titanium oxide, the hindered amine light stabilizer or the UV absorber or the antioxidant was changed or not blended in these comparative examples. The physical properties obtained by measuring these porous films are shown in Table-3 together with the molding conditions.

Further, the above porous films were subjected to thermal lamination with a PP base span bond nonwoven fabric (50 g/m²) at an embossing roll temperature of 150° C. to obtain laminate sheets of 85 g/m². The physical properties obtained by measuring these laminate sheets are shown in Table-3.

As apparent from the fact that the laminate sheets obtained in all comparative examples had a low hydraulic pressure resistance, they were inferior in a weatherability-heat resistance.

Comparative Examples 12 and 13

The same procedure as in Example 1 was repeated to obtain porous films, except that the heat treatment temperature was changed to 130° C. in Comparative Example 12 and a ratio (heat treatment draw ratio) of the cooling roll speed to the heat treatment roll speed was changed to 0.99 in Comparative Example 13. The physical properties obtained by measuring these porous films are shown in Table-3 together with the molding conditions.

Further, the above porous films were subjected to thermal lamination with a PP base span bond nonwoven fabric (50 g/m²) at an embossing roll temperature of 150° C. to obtain laminate sheets of 85 g/m². The physical properties obtained by measuring these laminate sheets are shown in Table-3.

The laminate sheet was reduced in a water vapor transmission rate in Comparative Example 12 in which the heat treatment temperature was changed to 130° C., and the film was increased in a heat shrinkage in Comparative Example 13 in which the heat treatment draw ratio was changed to 0.99.

TABLE 2

|  |  |  | Example 1 | Example 2 | Example 3 | Example 4 | Example 5 | Example 6 |
|---|---|---|---|---|---|---|---|---|
| Resin Blend | Polypropylene resin | Trade name | PN640G *1 | PN640G *1 | PN640G *1 | PN640G *1 | PN640G *1 | PN640G *1 |
|  |  | (parts by weight) | 100 | 100 | 100 | 100 | 100 | 100 |
|  | Low density polyethylene (parts by weight) |  | 15 | 35 | 15 | 15 | 15 | 15 |
|  | Ethylene-vinyl acetate copolymer (parts by weight) |  | 15 | 35 | 15 | 15 | 15 | 15 |
| Calcium carbonate (parts by weight) |  |  | 140 | 140 | 110 | 190 | 140 | 140 |
| Titanium dioxide |  | Trade name | A | A | A | A | A | A |
|  |  | (parts by weight) *5 | 8 | 8 | 8 | 8 | 8 | 8 |
| Hindered amine light stabilizer |  | Trade name | C | C | C | C | D | C |
|  |  | (parts by weight) *5 | 2.5 | 2.5 | 2.5 | 2.5 | 2.5 | 2.5 |
| Ethyl ester phosphorous acid or biphenylene phosphonite antioxidant |  | Trade name | G | G | G | G | G | H |
|  |  | (parts by weight) *5 | 0.5 | 0.5 | 0.5 | 0.5 | 0.5 | 0.5 |
| Hindered phenol antioxidant |  | Trade name | J | J | J | J | J | J |
|  |  | (parts by weight) *5 | 1.0 | 1.0 | 1.0 | 1.0 | 1.0 | 1.0 |
| Stable molding speed (m/min) of primary film |  |  | 40 | 55 | 40 | 40 | 40 | 40 |
| Molding speed (m/min) after drawing |  |  | 80 | 110 | 80 | 80 | 80 | 80 |
| Heat treatment roll temperature (° C.) |  |  | 110 | 110 | 110 | 110 | 110 | 110 |
| Cooling roll speed/heat treatment roll speed (R2/R1) |  |  | 0.89 | 0.89 | 0.89 | 0.89 | 0.89 | 0.89 |
| Film thickness ($\mu$m) after drawing |  |  | 35 | 35 | 35 | 35 | 35 | 35 |
| Film crystallizing temperature (° C.) |  |  | 119 | 117 | 119 | 120 | 119 | 119 |
| Film heat shrinkage MD/TD (%) |  |  | 4.0/0.0 | 4.4/0.0 | 4.0/0.0 | 3.7/0.0 | 4.1/0.0 | 4.0/0.0 |
| Film water vapor transmission rate (g/m$^2$ · 24 h) |  |  | 1900 | 1400 | 1300 | 2400 | 1900 | 1900 |
| Film tear strength (mN) |  |  | 95 | 75 | 100 | 100 | 95 | 95 |
| Film maximum pore diameter ($\mu$m) |  |  | 1.3 | 1.1 | 1.1 | 1.6 | 1.3 | 1.3 |
| Film hydraulic pressure resistance (KPa) |  |  | 250 | 270 | 290 | 190 | 250 | 250 |
| Film appearance (presence of vertical stripes) |  |  | None | None | None | None | None | None |
| Laminate sheet water vapor transmission rate (g/m$^2$ · 24 h) |  |  | 1850 | 1350 | 1250 | 2300 | 1850 | 1800 |
| Laminate sheet hydraulic pressure resistance (KPa) *4 |  |  | 80 | 90 | 105 | 60 | 75 | 95 |

*1 ethylene-propylene block copolymer
*4 hydraulic pressure resistance of laminate sheet which was irradiated with a UV ray at an intensity of 88 MJ/m$^2$ and then subjected to heat treatment at 90° C. for 7 weeks in a gear oven
*5 amount per 100 parts by weight of "resin blend" ("polypropylene base resin" plus "low density polyethylene" plus "ethylene-vinyl acetate copolymer")

TABLE 3

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Resin blend | Polypropylene resin | Trade name | PN540G *2 | PN130G *3 | PN640G *1 | PN640G *1 | PN640G *1 | PN640G *1 | PN640G *1 |
|  |  | (parts by weight) | 100 | 100 | 100 | 100 | 100 | 100 | 100 |
|  | Low density polyethylene (parts by weight) |  | 15 | 15 | — | 15 | 15 | 15 | 15 |
|  | Ethylene-vinyl acetate copolymer (parts by weight) |  | 15 | 15 | 15 | — | 15 | 15 | 15 |
| Calcium carbonate (parts by weight) |  |  | 140 | 140 | 140 | 140 | 140 | 140 | 110 |
| Titanium dioxide |  | Trade name | A | A | A | A | — | B | A |
|  |  | (parts by weight) *5 | 8 | 8 | 8 | 8 | — | 8 | 8 |
| Hindered amine light stabilizer or UV absorber |  | Trade name | C | C | C | C | C | C | — |
|  |  | (parts by weight) *5 | 2.5 | 2.5 | 2.5 | 2.5 | 2.5 | 2.5 | — |
| Ethyl ester phosphorous acid or biphenylene phosphonite antioxidant |  | Trade name | G | G | G | G | G | G | G |
|  |  | (parts by weight) *5 | 0.5 | 0.5 | 0.5 | 0.5 | 0.5 | 0.5 | 0.5 |
| Hindered phenol antioxidant |  | Trade name | J | J | J | J | J | J | J |
|  |  | (parts by weight) *5 | 1.0 | 1.0 | 1.0 | 1.0 | 1.0 | 1.0 | 1.0 |
| Stable molding speed (m/min) of primary film |  |  | 35 | 40 | 10 | 40 | 40 | 40 | 40 |
| Molding speed (m/min) after drawing |  |  | 70 | 80 | 20 | 80 | 80 | 80 | 80 |
| Heat treatment roll temperature (° C.) |  |  | 110 | 110 | 110 | 110 | 110 | 110 | 110 |
| Cooling roll speed/heat treatment roll speed (R2/R1) |  |  | 0.89 | 0.89 | 0.89 | 0.89 | 0.89 | 0.89 | 0.89 |
| Film thickness ($\mu$m) after drawing |  |  | 35 | 35 | 35 | 35 | 35 | 35 | 35 |
| Film crystallizing temperature (° C.) |  |  | 119 | 119 | 119 | 116 | 119 | 119 | 119 |
| Film heat shrinkage MD/TD (%) |  |  | 4.0/0.0 | 4.4/0.0 | 5.0/0.0 | 5.0/0.0 | 4.0/0.0 | 4.0/0.0 | 4.0/0.0 |
| Film water vapor transmission rate (g/m$^2$ · 24 h) |  |  | 800 | 1400 | 2300 | 1900 | 1800 | 1800 | 1900 |
| Film tear strength (mN) |  |  | 35 | 30 | 100 | 95 | 95 | 90 | 90 |

TABLE 3-continued

| | | | | | | |
|---|---|---|---|---|---|---|
| Film maximum pore diameter (μm) | 1.3 | 1.1 | 1.5 | 1.3 | 1.4 | 1.6 | 1.3 |
| Film hydraulic pressure resistance (KPa) | 250 | 270 | 220 | 230 | 240 | 240 | 250 |
| Film appearance (presence of vertical stripes) | None | None | None | Present | None | None | None |
| Laminate sheet water vapor transmission rate (g/m² · 24 h) | 700 | 1300 | 2200 | 1850 | 1700 | 1700 | 1800 |
| Laminate sheet hydraulic pressure resistance (KPa) *4 | 65 | 75 | 60 | 60 | 15 | 35 | 5 |

| | | | Comparative Example 8 | Comparative Example 9 | Comparative Example 10 | Comparative Example 11 | Comparative Example 12 | Comparative Example 13 |
|---|---|---|---|---|---|---|---|---|
| Resin blend | Polypropylene resin | Trade name | PN640G *1 | PN640G *1 | PN640G *1 | PN640G *1 | PN640G *1 | PN640G *1 |
| | | (parts by weight) | 100 | 100 | 100 | 100 | 100 | 100 |
| | Low density polyethylene (parts by weight) | | 15 | 15 | 15 | 15 | 15 | 15 |
| | Ethylene-vinyl acetate copolymer (parts by weight) | | 15 | 15 | 15 | 15 | 15 | 15 |
| Calcium carbonate (parts by weight) | | | 140 | 140 | 110 | 140 | 140 | 110 |
| Titanium dioxide | Trade name | | A | A | A | A | A | A |
| | (parts by weight) *5 | | 8 | 8 | 8 | 8 | 8 | 8 |
| Hindered amine light stabilizer or UV absorber | Trade name | | E | F | C | C | C | C |
| | (parts by weight) *5 | | 2.5 | 2.5 | 2.5 | 2.5 | 2.5 | 2.5 |
| Ethyl ester phosphorous acid or biphenylene phosphonite antioxidant | Trade name | | G | G | — | I | G | G |
| | (parts by weight) *5 | | 0.5 | 0.5 | — | 0.5 | 0.5 | 0.5 |
| Hindered phenol antioxidant | Trade name | | J | J | — | J | J | J |
| | (parts by weight) *5 | | 1.0 | 1.0 | — | 1.0 | 1.0 | 1.0 |
| Stable molding speed (m/min) of primary film | | | 35 | 40 | 30 | 40 | 40 | 40 |
| Molding speed (m/min) after drawing | | | 70 | 80 | 60 | 80 | 80 | 80 |
| Heat treatment roll temperature (° C.) | | | 110 | 110 | 110 | 110 | 130 | 110 |
| Cooling roll speed/heat treatment roll speed (R2/R1) | | | 0.89 | 0.89 | 0.89 | 0.89 | 0.89 | 0.89 |
| Film thickness (μm) after drawing | | | 35 | 35 | 35 | 35 | 35 | 35 |
| Film crystallizing temperature (° C.) | | | 119 | 119 | 119 | 119 | 119 | 119 |
| Film heat shrinkage MD/TD (%) | | | 4.5/0.0 | 4.0/0.0 | 4.0/0.0 | 4.0/0.0 | 3.5/0.0 | 10.5/−0.6 |
| Film water vapor transmission rate (g/m² · 24 h) | | | 1900 | 1900 | 1750 | 1800 | 800 | 1950 |
| Film tear strength (mN) | | | 95 | 95 | 55 | 95 | 95 | 90 |
| Film maximum pore diameter (μm) | | | 1.3 | 1.3 | 1.9 | 1.3 | 1.3 | 1.2 |
| Film hydraulic pressure resistance (KPa) | | | 250 | 250 | 150 | 150 | 250 | 230 |
| Film appearance (presence of vertical stripes) | | | None | None | None | None | None | None |
| Laminate sheet water vapor transmission rate (g/m² · 24 h) | | | 1800 | 1750 | 1600 | 1700 | 700 | 1850 |
| Laminate sheet hydraulic pressure resistance (KPa) *4 | | | 30 | 30 | 5 | 40 | 100 | 80 |

*1 ethylene-propylene block copolymer
*2 ethylene-propylene random copolymer
*3 propylene homopolymer
*4 hydraulic pressure resistance of laminate sheet which was irradiated with a UV ray at an intensity of 88 MJ/m² and then subjected to heat treatment at 90° C. for 7 weeks in a gear oven
*5 amount per 100 parts by weight of "resin blend" ("polypropylene base resin" plus "low density polyethylene" plus "ethylene-vinyl acetate copolymer")

What is claimed is:

1. A porous film comprising a resin composition comprising:
   (a) a polypropylene base resin blend comprising 100 parts by weight of an ethylene-propylene block copolymer having a maximum peak melting temperature (Tm) of 140° C.≦Tm≦165° C. which is given by differential scanning calorimetry (DSC), 3 to 40 parts by weight of low density polyethylene and 3 to 40 parts by weight of ethylene-vinyl acetate copolymer,
   (b) calcium carbonate,
   (c) titanium dioxide coated on a surface thereof with silica and/or alumina,
   (d) a hindered amine light stabilizer having a molecular weight of 1500 to 4500,
   (e) an ethyl ester phosphorous acid or biphenylene phosphonite antioxidant, and
   (f) a hindered phenol antioxidant,
   wherein the above resin composition comprises 100 to 200 parts by weight of (b), 0.5 to 20 parts by weight of (c), 0.2 to 10 parts by weight of (d), 0.03 to 3 parts by weight of (e) and 0.05 to 3 parts by weight of (f) each per 100 parts by weight (a).

2. The porous film as described in claim 1, having a thickness of 20 to 60 μm.

3. The porous film as described in claim 1, having a tear strength of 50 mN or more in an aligning direction.

4. The porous film as described in claim 1, having a heat shrinkage of 10% or less.

5. The porous film as described in claim 1, having a thickness of 20 to 60 μm, a tear strength of 50 mN or more in an aligning direction and a heat shrinkage of 10% or less.

6. A production process for the porous film as described in any of claims 1 to 5, comprising the steps of:
   molding into a sheet, a porous film comprising a resin composition comprising:
   (a) a polypropylene base resin blend comprising 100 parts by weight of an ethylene-propylene block copolymer having a maximum peak temperature (Tm) of 140° C.≦Tm≦165° C. which is given by a differential scanning calorimetry (DSC), 3 to 40 parts by weight of low density polyethylene and 3 to 40 parts by weight of an ethylene-vinyl acetate copolymer,
   (b) calcium carbonate, (c) titanium dioxide coated on a surface thereof with silica and/or alumina,
(d) a hindered amine light stabilizer having a molecular weight of 1500 to 4500,
(e) as ethyl ester phosphorous acid or biphenylene phosphonite antioxidant, and
(f) a hindered phenol antioxidant, wherein the above resin composition comprises 100 to 200 parts by weight of (b), 0.5 to 20 parts by weight of (c), 0.2 to 10 parts by weight of (d), 0.03 to 3 parts by weight of (e) and 0.05 to 3 parts by weight of (f) each per 100 parts by weight of (a), drawing the above sheet, and then subjecting it to heat treatment.

7. A production process for the porous film as described in any of claims 1 to 5, comprising the steps of:

molding into a sheet, a porous film comprising a resin composition comprising:
(a) a polypropylene base resin blend comprising 100 parts by weight of an ethylene-propylene block copolymer having a maximum peak temperature (Tm) of 140° C.$\leq$Tm$\leq$165° C. which is given by differential scanning calorimetry (DSC), 3 to 40 parts by weight of low density polyethylene and 3 to 40 parts by weight of an ethylene-vinyl acetate copolymer,
(b) calcium carbonate,
(c) titanium oxide coated on a surface thereof with silica and/or alumina,
(d) a hindered amine light stabilizer having a molecular weight of 1500 to 4500,
(e) an ethyl ester phosphorous acid or biphenylene phosphonite antioxidant, and
(f) a hindered phenol antioxidant, wherein the above resin composition comprises 100 to 200 parts by weight of (b), 0.5 to 20 parts by weight of (c), 0.2 to 10 parts by weight of (d), 0.03 to 3 parts by weight of (e) 0.05 and to 3 parts by weight of (f) each per 100 parts by weight of (a), drawing the above sheet, then subjecting it to heat treatment at a temperature (T) satisfying the following equation (1):

$$Tc-30 \leq T < Tc \quad (1)$$

(wherein Tc represents a crystallizing temperature of the raw material resin composition, and T represents a heat treatment roll temperature), and then taking it at a heat treatment draw ratio (R2/R1) satisfying the following equation (2):

$$0.50 \leq (R2/R1) \leq 0.95 \quad (2)$$

(wherein R1 represents a heat treatment roll speed, and R2 represents a cooling roll speed).

8. The process as described in claim 6, wherein the film is drawn monoaxially or biaxially to at least 1.3 time in terms of an area magnification.

9. A laminate sheet comprising the porous film as described in claim 1 and laminated thereon a polyolefin base nonwoven fabric.

10. The process as described in claim 7, wherein the film is drawn monoaxially or biaxially to at least 1.3 time in terms of an area magnification.

* * * * *